United States Patent [19]

Bammer et al.

[11] Patent Number: 5,643,548
[45] Date of Patent: Jul. 1, 1997

[54] DRYING AND SEPARATING PROCESS AND PLANT

[75] Inventors: Josef Bammer, Lenzing; Bernhard Blocher, Kapfenberg; Wolfgang Glaser; Heinz Loquenz, both of Graz; Walter Staufer, Seewalchen; Peter Yaldez, Graz, all of Austria

[73] Assignee: Austrian Energy & Environment SGP/Wagner-Biro GmbH, Vienna, Austria

[21] Appl. No.: 464,810

[22] PCT Filed: Dec. 2, 1993

[86] PCT No.: PCT/AT93/00182

§ 371 Date: Aug. 9, 1995

§ 102(e) Date: Aug. 9, 1995

[87] PCT Pub. No.: WO94/13580

PCT Pub. Date: Jun. 23, 1994

[30] Foreign Application Priority Data

Dec. 4, 1992 [AT] Austria ................ 2399/92

[51] Int. Cl.⁶ .................. C01B 17/50; B01D 11/04
[52] U.S. Cl. .................. 423/540; 423/171; 423/555; 422/173; 422/269; 422/270; 432/58; 432/103
[58] Field of Search .................. 422/269, 270, 422/173, 139; 423/171, 555, 540; 432/58, 103

[56] References Cited

U.S. PATENT DOCUMENTS

| | | | |
|---|---|---|---|
| 3,156,455 | 11/1964 | Boulet | 423/171 |
| 3,437,330 | 4/1969 | Worner | 422/269 |
| 3,607,033 | 9/1971 | Shah | 423/540 |
| 3,607,068 | 9/1971 | Campbell et al. | 423/171 |
| 3,826,812 | 7/1974 | Cook et al. | 423/242 |
| 4,247,518 | 1/1981 | Charlet et al. | 422/142 |
| 4,455,285 | 6/1984 | Watkins et al. | 423/171 |
| 4,569,831 | 2/1986 | Cohen | 423/171 |
| 4,990,319 | 2/1991 | Takenouchi et al. | 423/352 |
| 5,169,444 | 12/1992 | Boos et al. | 106/772 |
| 5,169,617 | 12/1992 | Clemens et al. | 423/555 |
| 5,437,850 | 8/1995 | Kroehl et al. | 423/171 |

FOREIGN PATENT DOCUMENTS

| | | |
|---|---|---|
| 347236 | 12/1978 | Austria . |
| 0331294 | 9/1989 | European Pat. Off. . |
| 2094193 | 2/1972 | France . |
| 2264878 | 10/1975 | France . |
| 1199741 | 9/1965 | Germany . |
| WO92/16468 | 10/1992 | WIPO . |

*Primary Examiner*—Nina Bhat
*Attorney, Agent, or Firm*—Steinberg, Raskin & Davidson, P.C.

[57] ABSTRACT

A process and plant for drying and then separating moist salts, such as magnesium sulfite, in which the moist magnesium sulfite is heated to a temperature greater than or equal to about 200° C. in a dryer and the passed through a solid materials lock into a separating plant. The dryer is heated by a circulating stream of exhaust vapors which is heated in a heat exchanger by exhaust gas generated in the separating plant so that the water of crystallization of the magnesium sulfite as well as residual humidity is eliminated during the drying process. Vapor-free acid anhydride, usually sulphur dioxide, is prepared in the separating plant from the dehydrated salt and a metal oxide, e.g., MgO, is recovered or otherwise used. The acid anhydride may be liquified and has a large degree of purity.

15 Claims, 2 Drawing Sheets

DRYING AND SEPARATING PROCESS AND PLANT

BACKGROUND OF THE INVENTION

The present invention relates to a process for drying and then separating moist salts, such as magnesium sulfite, coming from a wet sulphur dioxide ($SO_2$) absorption plant into MgO, $SO_2$ and water vapor. The moist magnesium sulfite is dried in a dryer and then passed through a solid materials lock to a separating plant which is separated from the dryer thereby. A gaseous component of $SO_2$ separated from the magnesium sulfite in the separating plant is used to heat combustion air needed to heat the separating plant and another gaseous stream of exhaust gas escaping from the separating plant is used to heat the dryer.

The present invention also relates to an installation for drying and subsequently separating moist salts such as magnesium sulfite coming from a wet $SO_2$ absorption plant.

In chemical reclamation plants (such as those described in Austrian Patent No. 347,235) and in wet desulfurization plants operating on the basis of MgO, as well as in other salt reclamation plants, a salt such as $MgSO_3$ or $Mg(HSO_3)_2$ develops in a moist or dissolved state. If this salt is separated for reclamation of the components, acid vapors such as $SO_2$-water vapor mixtures develop at high temperatures, and such mixtures are highly corrosive during cooling (condensation of the water vapor) and also operate to thin the acid to be obtained or cause the acid to be combined with the corrosion products. This hinders heat recovery, equipment costs increase and productive power drops. Moreover, the corrosive vapors adversely affect the equipment, so that maintenance expenses or replacement expenses further lower the productive power of the chemical reclamation plant. Thus, the overall presence of $SO_2$-water vapor mixtures is very problematic in salt reclamation operations.

Another reference, German Patent Publication No. DE 1 199 74 describes a similar process for obtaining sulphur dioxide by using zinc oxide whereby the main problem is to avoid sulphatizing the zinc in the separation reactor. This problem does not occur in the present invention wherein the main difficulty sought to be overcome is the corrosion of the elements of the separation plant due to the presence of sulphur dioxide-water vapor mixtures and the high heat requirements of the plant.

OBJECTS AND SUMMARY OF THE INVENTION

Accordingly, it is an object of the present invention to provide a new and improved drying and separating process and installation for moist salts, such as magnesium sulfite, in which the problems described above are avoided.

It is another object of the present invention to provide a new and improved drying and separating process and installation which substantially eliminates the disadvantages mentioned above by separating sulphur dioxide ($SO_2$) and steam ($H_2O$) to prevent the formation of sulphur dioxide-water vapor mixtures. As such, a pure (dry) acid anhydride ($SO_2$) is formed. In accordance with the invention, it has been found that the components affected by the pure (dry) acid anhydride ($SO_2$) are less subject to corrosion than if contacted with $SO_2$-water vapor mixtures, so that the productive power of the plant is unexpectedly high.

In the process in accordance with the invention, the dryer in which the moist salts ($MgSO_3$) are situated is heated to a temperature of about 200° C. and preferably more than 200° C. by the circulation of a portion of an exhaust vapor stream of the dryer through a system of conduits. The portion of the exhaust vapor stream of the dryer is heated as a result of heat exchange with an exhaust gas being discharged from the separation plant and directed through a system of conduits, i.e., by passing the streams through separated tubes of a heat exchanger. By means of the heating to a temperatures greater than about 200° C., in addition to the moisture adhering to the salt, the water of crystallization of the salt in particular, is completely eliminated in this drying operation. Thus, in the separation plant in accordance with the invention, and in which the process in accordance with the invention is applied, $SO_2$ with a purity value of about 70%, and preferably more than 70%, is produced and MgO in the form of dust is produced (in the separating plant) for feedback into an $SO_2$ absorption plant.

In the installation in accordance with the invention, the separating plant is made in form of an indirectly heated rotary tubular kiln and the dryer is made in form of a directly heated rotary tubular kiln or in form of a fluidized bed dryer, in particular with heating surfaces dipping into the fluidized bed. A feedback channel or other conduit is connected thermically to the separating plant, i.e., via a heat exchanger, for part of the stream of the water/steam mixture produced in the dryer. Preferably, the drying and separating plant is incorporated thermically and in manufacture into an $SO_2$ absorption plant, in particular for the reclamation of the boiling acid of a cellulose production. The dryer and the separating plant may also be incorporated into a $SO_2$ absorption plant of a caloric power plant, the separated $SO_2$ being obtained in a liquefied form.

The installation may include a dust collection apparatus through which the partial exhaust vapor stream from the dryer is directed prior to its passage through the heat exchanger. This dust collection apparatus has a dust outlet side at which dust collects and an exhaust vapor side. The dust collected at the dust outlet side is directed into the dryer. A portion of exhaust vapor from the exhaust vapor side is passed to an exhaust vapor utilization system and another portion of exhaust vapor is directed to the heat exchanger and therefrom into the dryer. The separating plant has an exhaust gas side which is connected to the heat exchanger.

As to the particulars of the $SO_2$ absorption plant, such a plant may have a liquid circuit and sludge side at which magnesium sulfite is accumulated and which is connected to the dryer. The separating plant has a solid material side at which magnesium oxide is accumulated and which is connected to a liquid circuit of the $SO_2$ absorption plant. Also, the $SO_2$ absorption plant may include a compressor and a steam producing unit having a steam/air pre-heater. A portion of the exhaust vapor stream from the dryer which is not passed through the heat exchanger is directed through this compressor to the steam/air pre-warmer. Moreover, the $SO_2$ absorption plant may comprise a steam producing unit having a combustion chamber whereby the exhaust stream from the separating plant is incorporated into the combustion chamber in the form of an oxygen carrier before the $SO_2$ absorption plant.

In addition, the invention makes it possible to effect a nearly residue-free desulfurization of caloric power plant exhaust gases in that the metal oxide (MgO) is reused for absorption and develops in form of $SO_2$ and possible $CO_2$ in a salable state. The invention also makes it possible to use dolomite, essentially $CaMg(CO_3)_2$, as the absorption means for the economic production of pure MgO. In this case, of course the pure calcium sulfite which develops can be utilized or deposited, and the acid anhydride would be $CO_2$, with the advantage that through the obtaining of the MgO share, the entire calcium sulfite quantity is reduced to approximately 50% of what it was in $SO_2$ absorption plants operating on calcium base, so that the capacity of the gypsum market is not exceeded.

Another application of the invention is to obtain pure $CO_2$ from combustion exhaust gases on basis of calcium, in which the burning of the calcium takes place outside the combustion and the CaO or $Ca(OH_2)$ is used for the absorption of the $CO_2$-containing, practically $SO_2$-free exhaust gas. The developing calcium slurry ($CaCO_3$) is then dried and the water of crystallization is driven out for the major part, whereupon the water-free $CaCO_3$ is separated thermically and the calcium oxide is again fed to the absorption process.

BRIEF DESCRIPTION OF THE DRAWINGS

The drawings are illustrative of a preferred embodiment of the invention and are not meant to limit the scope of the invention as encompassed by the claims. The lines in the drawing connecting elements represent conduits.

DETAILED DESCRIPTION OF THE INVENTION

Figure 1:
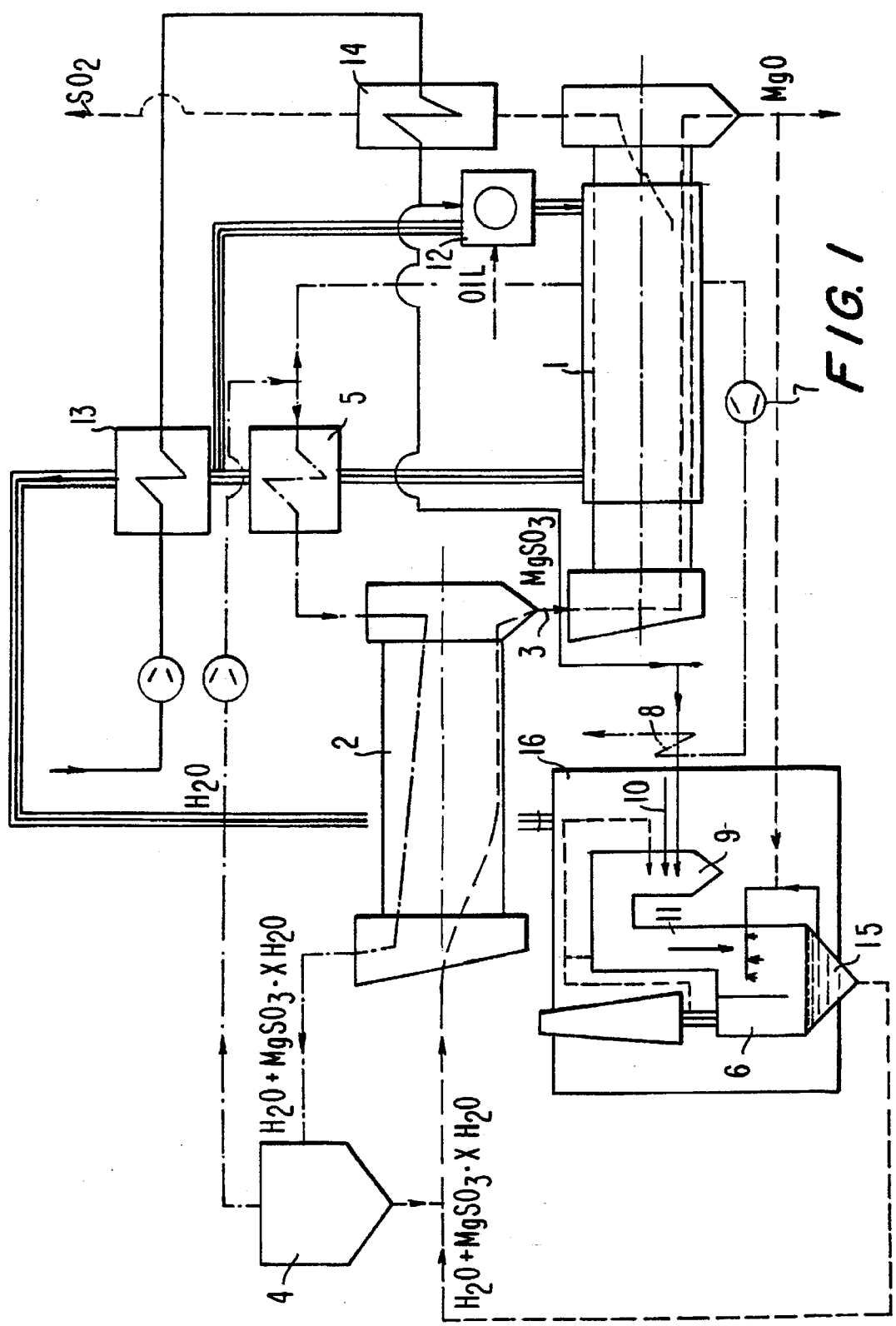
FIG. 1 is an illustration of a first embodiment of the invention.

Referring to the accompanying drawings wherein like reference numerals refer to the same or similar elements, as shown in FIG. 1, in accordance with the invention, a salt produced in a salt production plant is introduced into a dryer 2 in a moist state, i.e., with adhering water and with the crystal structure of incorporated water (water of crystallization), whereby the water contents are transferred completely to the heating medium as a result of the heating in the dryer to a temperature greater than or equal to about 200° C. The water of crystallization is necessary to maintain the crystalline properties of the salt but is capable of being removed therefrom by sufficient heat which is present in the dryer 2. In the illustrated embodiment, the salt is $MgSO_3 \cdot XH_2O$ and the addition of $H_2O$ reflects the moist condition of its entry into dryer 2.

When the dryer 2 is in the form of a rotary tubular kiln, a significant quantity of dust is carried into the dryer 2 with the heating medium (exhaust vapor as explained below), i.e., from the outlet end of the dryer 2 as shown in the drawing with respect to the inlet end of the salt. The dust is removed from the dryer into a conduit, i.e., from the inlet end of the dryer 2, and is returned to the dryer 2 after passing through a dust collection apparatus 4, e.g., a cyclone, having been discharged from a dust outlet side thereof. After the dust collection apparatus 4, the resultant quantity of dust is returned to the dryer 2 with the salt. The exhaust vapor is thus removed from the dryer 2, and directed through the duct collection apparatus 4 to remove dust therefrom, and then a portion thereof is directed back into the outlet end of the dryer 2 after it has been heated in a heat exchanger 5.

The dried salt produced in the dryer 2, from which the water of crystallization has been removed as well as the moisture adhering thereto, is directed through a solid materials lock 3 to a separating plant 1 in which the acid anhydride is separated from the metal oxide. In the illustrated embodiment, the acid anhydride is $SO_2$ and the metal oxide is MgO. The gas/solid material separation is relatively simple. The separating plant is heated indirectly, and to a temperature preferably in the vicinity of about 700° C., so that the heating gas does not come into contact with the medium, the dried salt, to be separated. The result of this indirect heating of the medium is that a practically pure acid anhydride, which in most cases is $SO_2$ or $CO_2$, accumulates and is unable to change into acid (with associated water) because of the absence of water and/or steam. In this manner, practically no dew point problem can occur in the separating plant 1 and the elements of the plant are correspondingly protected from corrosion, corrosion which would otherwise be present due to the acids (with water) components.

Hot exhaust gas is directed through tubing and conduits from the separating plant 1 in a circuit. A portion of the exhaust gas is heated in a combustion plant 12, after it has passed through at least heat exchanger 5 and lost some of its heat, so that upon its departure from the combustion plant 12 and entry into the separating plant 1, the temperature of the exhaust gas is slightly above the separating temperature, i.e., the temperature at which the separating plant is operating. The recirculation of exhaust gas leads to a reduction of $NO_x$ contents therein. The separating plant 1 exhaust gas is first cooled in the heat exchanger 5, wherein its heat is transferred to the exhaust vapor for the dryer 2, and thereafter the separating plant exhaust gas flows into an air heater 13. In air heater 13, fresh air is introduced and is preheated with the intent to deliver the heated air to the combustion plant 12 and, if necessary, to a steam producing unit 9. This stream of fresh air is further heated in a second air heater 14, prior to the combustion unit 12 and possible steam producing unit 9. In the second air heater 14, the acid anhydride coming out of the separating unit 1, mainly $SO_2$, transfers its heat to this stream of fresh air and is thus cooled down from the separating temperature.

The cooled separating plant exhaust gas, after it has passed through heat exchanger 5 and air heater 13, contains a relative large amount of heat and can therefore be used as a pre-heated oxygen carrier, when added to a quantity of oxygen, in the steam producing unit 9, e.g., of a lye burning plant 16 in order to increase the heat turnover. The steam producing unit 9 is heated by fuel 10 introduced therein which may be spent lye. Air from the second air heater 14 is further heated in a steam/air pre-heater 8, whereby the steam in the pre-heater 8 is the excess exhaust vapor from the dryer 2 (that portion which did not recirculate through the heat exchanger 5 and the dryer 2) which is compressed in a compressor 7 prior to its passage through the pre-heater 8. Thus, part of the combustion air being directed into and through the pre-heater 8 can be fed via the air pre-heaters 13 and 14.

The steam producing unit 9 can be an oil-fired power plant boiler the exhaust gas of which contains $SO_2$. In the plant boiler, $SO_2$ is absorbed by a metal oxide foam, e.g., MgO, with a view toward forming the salt or sulphate $MgSO_3$, whereby the salt $MgSO_3$ accumulates in the form of an insoluble bottom sediment. This $MgSO_3$-containing sediment may then be introduced in form of a water/salt mixture into the dryer 2, preferably after at least an initial drying process. The use of a power plant boiler offers the advantage that the absorption medium is produced in the plant itself and that the contaminant $SO_2$ occurs in a practically pure and highly concentrated form, i.e., is salable. The economic significance now lies in an exhaust gas desulfurization plant which does not require any waste dump.

If the steam producing unit 9 is used in a cellulose plant on a magnesium bisulfite basis, as indicated by reference number 16, the spent cellulose lye is used as the fuel 10 and the exhaust gas contains a relatively large amount of $SO_2$, so that a bisulfite production plant 11 can be intercalated or interposed between an $SO_2$ absorption plant 6 and the steam producing unit 9, through which the magnesium bisulfite which is needed in the cellulose process is produced. The remaining $SO_2$ can then be absorbed or recovered from the exhaust gas in the manner mentioned above, or can be made available for the cellulose process. The plant furthermore makes it possible to obtain $CO_2$ from the $SO_2$-free exhaust gases of power plant boiler installations, whereby calcium or CaO is used or recycled as the absorption medium, for example. The exhaust gas coming from the separating plant 1 which has given up part of its heat to the heat exchanger 5 or to the air heater 13 can now be mixed in the combustion chamber or into the exhaust gas before the flue, depending on the remaining heat contained in the steam producing unit 9, in particular in case of increased oxygen 5 contents, or also before the sulfite production unit 15, if the quantity of $SO_2$ is high.

Briefly, an $SO_2$ absorption plant 6 is an installation in which the $SO_2$ content of a fluegas is absorbed by an absorbent, in this case either CaO or MgO. The flue gas comes from a steam generator 9 fired by coal or oil or another sulfur-containing fuel, preferably by "used boiling acid" of a cellulose production process containing lignin and other organic substances. The steam generator 9 is part of a caloric power plant or, in the case of a cellulose production operation, [art of the recovery plant for the new boiling acid. At present, in view of environmental concerns, the fluegas must not contain $SO_2$ impurities. As such, an $SO_2$ absorption plant is required. The absorption plant delivers $MgSO_3$ or $CaSO_3$ which must be split into MgO or CaO and $SO_2$, the MgO and CaO being reusable in the absorption plant and the $SO_2$ salable in liquid form.

The installation can furthermore be also used for pure MgO reclamation from Dolomite, with calcium sulfite being produced as a waste material if it cannot be used for gypsum production. Of course, only part of the $SO_2$ can then be reclaimed from the exhaust gas of the steam producing unit 9.

Figure 2:
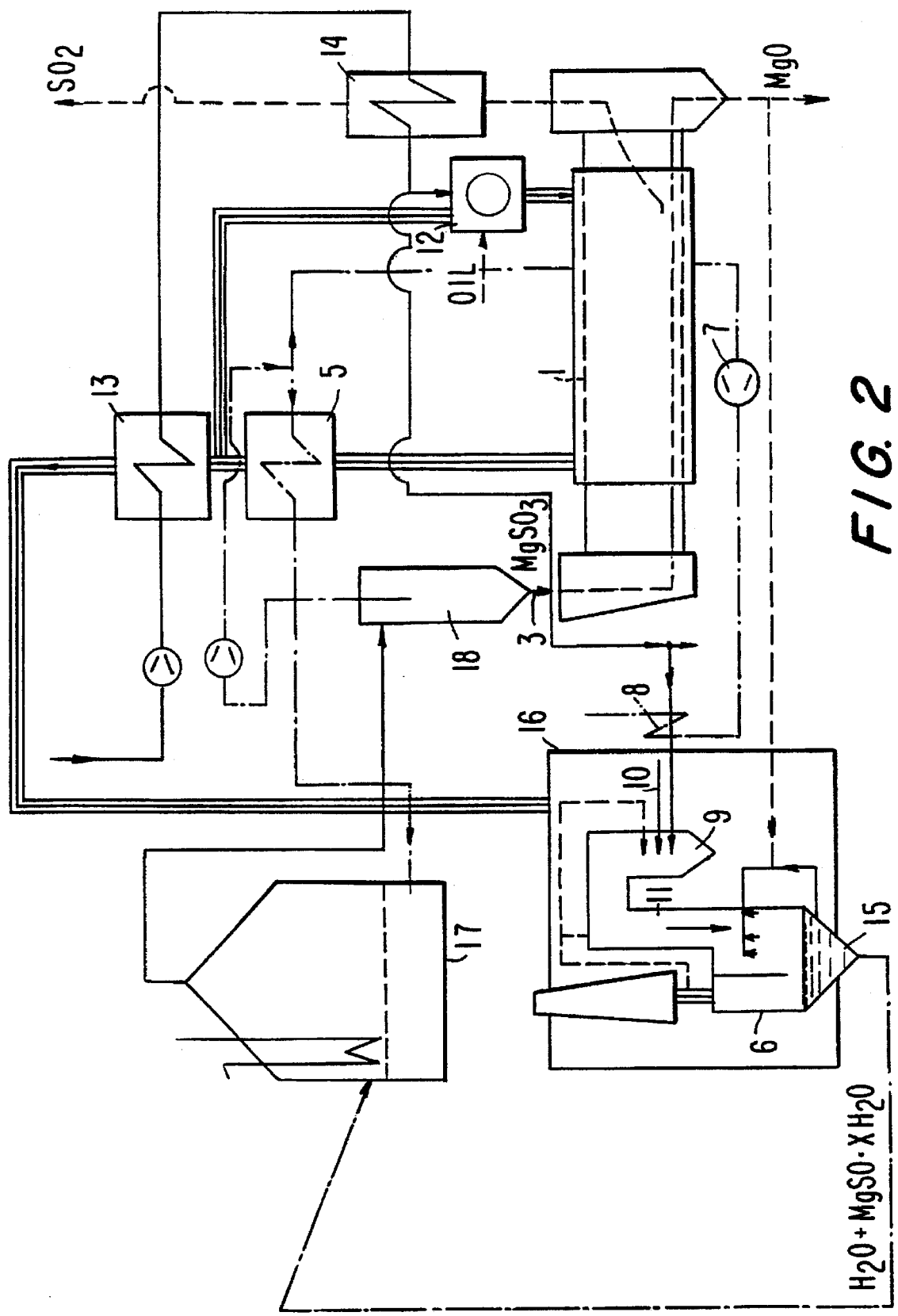
FIG. 2 is an illustration of a second embodiment of the invention.

As shown in FIG. 2, instead of a kiln dryer 2 and associated dust collection apparatus 4, a fluidized bed dryer 17 may be utilized. A fluidized bed dryer 17 includes heating surfaces and in a similar manner to the embodiment described in FIG. 1, a moist salt is introduced therein. Exhaust vapor is directed from the fluidized bed dryer 2 to a zylon separator 18, the gas therefrom is removed as exhaust (a portion of which is later reheated and redirected through the fluidized bed dryer 2) while the solid material is passed via the solid materials lock 3 to the separating plant 1.

The examples provided above are not meant to be exclusive. Many other variations of the present invention would be obvious to those skilled in the art, and are contemplated to be within the scope of the appended claims. It is thus understood that a large variety of salts can be dried and separated in the inventive process and installation.

We claim:

1. Process for forming dried sulfur dioxide from moist magnesium sulfite, comprising the steps of:

directing a by-product comprising moist magnesium sulfite from a flue gas desulfurization tank into a dryer;

drying the moist magnesium sulfite in the dryer to generate an exhaust vapor stream and dried magnesium sulfite;

passing the dried magnesium sulfite through a solid materials lock to a cracking plant separated by the solid materials lock from the dryer;

cracking the dried magnesium sulfite in the cracking plant to form magnesium oxide, sulfur dioxide and an exhaust gas stream;

directing a portion of the exhaust vapor stream from the dryer and the exhaust gas stream removed from the cracking plant into a heat exchanger to exchange heat;

heating the dryer to a temperature of about 200° C. by circulating therethrough at least a portion of the exhaust vapor stream after it has been heated in the heat exchanger such that moisture adhering to the magnesium sulfite and water of crystallization of the magnesium sulfite is substantially eliminated in the dryer; and removing dried sulfur dioxide from the cracking plant.

2. The process of claim 1, further comprising the steps of: producing $SO_2$ in the cracking plant having a purity of over about 70%; producing MgO in form of dust in the cracking plant; and directing the MgO into the $SO_2$ absorption plant.

3. The process of claim 1, wherein the dryer is heated to a temperature over 200° C.

4. An installation for forming dried sulfur dioxide from moist magnesium sulfite comprising:

a dryer for receiving the moist magnesium sulfite and for drying the moist magnesium sulfite to generate an exhaust vapor stream and dried magnesium sulfite;

a cracking plant for receiving the dried magnesium sulfite and cracking the dried magnesium sulfite into magnesium oxide, sulfur dioxide and steam;

materials lock for controlling the passage of the dried magnesium sulfite from the dryer into the cracking plant, said cracking plant being separated by the materials lock from the dryer;

means for directing a portion of an exhaust vapor stream from the dryer into said heat exchanger;

means for directing a portion of the exhaust gas from the cracking plant into said heat exchanger to exchange heat with said portion of said exhaust vapor stream;

means for heating the dryer to a temperature over about 200° C., said heating means comprising the circulation therethrough of said portion of said exhaust vapor stream after it has been heated in said heat exchanger, whereby moisture adhering to the magnesium sulfite and water of crystallization of the magnesium sulfite is substantially eliminated in the dryer.

5. The installation of claim 4, wherein said cracking plant comprises an indirectly heated rotary tubular kiln and said dryer comprises a directly heated rotary tubular kiln.

6. The installation of claim 4, wherein dryer comprises a fluidized bed dryer having heating surfaces dipping into a fluid bed therein.

7. An $SO_2$ absorption plant including the installation of claim 4, wherein the dryer and the cracking plant are incorporated thermically and by manufacture.

8. The $SO_2$ absorption plant of claim 7, wherein the $SO_2$ absorption plant has a liquid circuit and sludge side including the flue gas sulfurization tank in which magnesium sulfite is accumulated, said sludge side of said absorption plant being connected to the dryer, and the cracking plant having a solid material side at which magnesium oxide is accumulated, said solid material side of the cracking plant being connected to a liquid circuit of the $SO_2$ absorption plant.

9. The $SO_2$ absorption plant of claim 7, further comprising a compressor and a steam producing unit having a steam/air pre-heater, a portion of the exhaust vapor stream from the dryer which is not passed through said heat exchanger being directed through said compressor to said steam/air pre-warmer.

10. The $SO_2$ absorption plant of claim 9, further comprising a steam producing unit having a combustion chamber, the exhaust stream from the cracking plant being incorporated into said combustion chamber in the form of an oxygen carrier before said $SO_2$ absorption plant.

11. An $SO_2$ absorption plant for the reclamation of boiling acid of a cellulose production plant including the installation of claim 4, wherein the dryer and the cracking plant are incorporated thermically and by manufacture.

12. An $SO_2$ absorption plant of a caloric power plant including the installation of claim 4, wherein, the separated $SO_2$ is obtained in a liquefied form.

13. The $SO_2$ absorption plant of claim 12, wherein the $SO_2$ absorption plant has a liquid circuit and sludge side including the flue gas sulfurization tank in which magnesium sulfite is accumulated, said sludge side of said absorption plant being connected to the dryer, and the cracking plant having a solid material side at which magnesium oxide is accumulated, said solid material side of the cracking plant being connected to a liquid circuit of the $SO_2$ absorption plant.

14. The installation of claim 4, further comprising
a dust collection apparatus through which the partial exhaust vapor stream from the dryer is directed prior to its passage through the heat exchanger, said dust collection apparatus having a dust outlet side at which dust collects and an exhaust vapor side, the dust collected at the dust outlet side being directed into the dryer, a portion of exhaust vapor from the exhaust vapor side being passed to an exhaust vapor utilization system and another portion of exhaust vapor being directed to said heat exchanger and therefrom into the dryer.

15. The installation of claim 4, wherein the cracking plant has an exhaust gas side, said exhaust gas side of the cracking plant being connected to said heat exchanger.

\* \* \* \* \*